United States Patent [19]

Fournier

[11] Patent Number: 5,423,187
[45] Date of Patent: Jun. 13, 1995

[54] ROOFTOP AIR CONDITIONING UNIT AND METHOD OF MODIFICATION WITH A ROTARY REGENERATIVE HEAT EXCHANGER

[75] Inventor: Bernard Fournier, 2820, Route 122, St-Cyrille, Cté Drummondville, Québec, Canada, J0C 1H0

[73] Assignees: Bernard Fournier; Giséle Surprenant Lemieux, both of Quebec, Canada

[21] Appl. No.: 159,785

[22] Filed: Nov. 30, 1993

[51] Int. Cl.⁶ .............................................. F25D 17/06
[52] U.S. Cl. ......................................... 62/94; 165/16; 62/271; 62/95
[58] Field of Search ................. 62/94, 95, 271; 165/16

[56] References Cited

U.S. PATENT DOCUMENTS

| | | | |
|---|---|---|---|
| 3,945,430 | 3/1976 | Van Beukering et al. | 165/9 |
| 4,347,712 | 9/1982 | Benton et al. | 165/16 |
| 4,426,853 | 1/1984 | Mitani et al. | 62/235.1 |
| 4,473,108 | 9/1984 | Jansson et al. | 165/8 |
| 4,497,361 | 2/1985 | Hajicek | 165/7 |
| 4,825,936 | 5/1989 | Hoagland et al. | 165/8 |
| 4,887,438 | 12/1989 | Meckler | 62/94 |
| 4,924,934 | 5/1990 | Steele | 165/8 |
| 4,960,166 | 10/1990 | Hirt | 165/9 |
| 5,069,272 | 12/1991 | Chagnot | 165/8 |
| 5,179,998 | 1/1993 | Des Champs | 165/1 |
| 5,183,098 | 2/1993 | Chagnot | 165/8 |

FOREIGN PATENT DOCUMENTS

2129533 6/1984 United Kingdom.
8808112 10/1988 WIPO.

OTHER PUBLICATIONS

Energy Recovery Ventiltors—Models ERV-400 and ERV-400N, Installation, Operating & Service Instructions, from Airxchange, Aug. 1991.
Cooling/Heating—Energy Recovery Systems, from Airxchange, 1991(?).
Rooftop Energy Recovery Ventilator, Model RTU-1000, from Airxchange, 1991(?).

*Primary Examiner*—John M. Sollecito
*Attorney, Agent, or Firm*—Collard & Roe

[57] ABSTRACT

A rooftop air conditioning unit for conditioning air in a conditioned space is provided with a rotary regenerative exchanger where sensible and latent heat transfer occur between exhaust air and fresh air with the use of a rotary regenerative exchanger. The exchanger is secured to the housing of the unit in front of a side opening adjacent the air circuit thereof. The position of the exchanger avoids a modification in the conditioned air ductwork of the conditioned space and allows sharing the same roof reinforcement structure with the original unit.

13 Claims, 4 Drawing Sheets

ROOFTOP AIR CONDITIONING UNIT AND METHOD OF MODIFICATION WITH A ROTARY REGENERATIVE HEAT EXCHANGER

FIELD OF THE INVENTION

The present invention relates generally to a rooftop air conditioning unit for conditioning air in a conditioned space where sensible and latent heat transfer occur between exhaust air and fresh air with the use of a rotary regenerative exchanger.

BACKGROUND OF THE INVENTION

As the saving of energy became increasingly important, many different kinds of rotary regenerative exchangers were developed in the air conditioning industry for reducing the waste of energy when heating or cooling fresh air introduced in the conditioned space. The purpose of these exchange wheels is to transfer sensible and latent heat from the evacuated air to the fresh air by rotating an exchange wheel through which is flowing the exhaust air, in one half thereof, and the fresh air, in the other half thereof. The exchange wheels, currently found on the market, are made with a plurality of layers of a porous material through which air can flow and sensible and latent heat can be accumulated.

The exchange wheels are generally suitable for all seasons. During cool periods, the evacuated air transfers some of its sensible and latent heat to portions of the wheel through which the exhaust air flows. Since the wheel is rotating, these portions will eventually be in the flow of fresh air and will then transfer the accumulated sensible and latent heat to the fresh air, thereby reducing the heating and humidifying loads for conditioning the conditioned space.

During warm periods, the fresh air transfers some of its sensible and latent heat to portions of the wheel through which the exhaust air flows. As aforesaid, the wheel is rotating and these portions will eventually be in the flow of the exhaust air and will then transfer the accumulated sensible and latent heat to the exhaust air. The fresh air introduced in the conditioned space is then cooler and dryer, thus reducing the cooling load for conditioning the conditioned space.

Examples of rotary exchange wheels are found in U.S. Pat. Nos. 3,945,430, 4,473,108, 4,924,934 and 4,960,166.

The main drawback of existing rotary regenerative exchangers is that they are generally independent devices requiring additional air ducts for connection with the usual conditioning systems as the ones found in buildings. When installed on a rooftop, they require an additional hole with a supporting structure for reinforcing the surrounding of the hole in compensation of the additional weight. This is particularly costly and complicated if a rotary regenerative exchanger has to be installed on an existing air conditioning system because modifications of the ductwork and the roof structures are costly and not always easy to do.

SUMMARY OF THE INVENTION

The object of the present invention is to provide an air conditioning rooftop unit on which is secured a rotary regenerative exchanger for providing a compact and convenient air conditioning device, without the need of modifying the ductwork or making an additional hole in the roof.

More particularly, the object of the present invention is to provide a rooftop air-conditioning unit for conditioning air from a conditioned space, the unit comprising:

a housing;
an air circuit located in the housing, the air circuit comprising:
  an air entry for connection with an exhaust air ductwork of the conditioned space;
  first blowing means for circulating the air in the air circuit;
  air temperature conditioning means for varying the temperature of the air; and
  an air exit for connection with a conditioned air ductwork of the conditioned space;
a rotary regenerative exchanger secured in front of a side opening of the housing, the side opening communicating with the air circuit, the exchanger comprising:
  an air outlet for partially evacuating the air outside the housing, the evacuated air being drawn from the air circuit by second blowing means;
  an actuated balance damper secured in front of the air outlet for regulating the flow of the evacuated air;
  actuating means for actuating the balance damper;
  an air inlet for supplying fresh air inside the air circuit, the fresh air being drawn from outside the housing by third blowing means;
  a rotary exchange wheel assembly for providing sensible and latent heat transfer between the evacuated air and the fresh air upon rotation of an exchange wheel by rotation means; and
  means for controlling the actuating means, the second blower means, the third blower means and the rotation means.

According to a preferred embodiment, the unit further comprises a pre-heating means located in the air inlet for heating the fresh air, preferably when the temperature thereof is lower than −15° C.

According to another preferred embodiment, the air outlet is connected to the plenum chamber for partially evacuating the air therefrom.

According to a still preferred embodiment, the air temperature conditioning means comprise a cooling coil for cooling the air.

According to a still preferred embodiment, he air temperature conditioning means comprise an electric heating element for heating the air.

It is also an object of the present invention to provide an improvement in an installed rooftop unit for conditioning air from a conditioned space, the unit comprising:

a housing;
an air circuit located in the housing, the air circuit comprising:
  an air entry connected with an exhaust air ductwork of the conditioned space;
  first blowing means for circulating the air in the air circuit;
  air temperature conditioning means for varying the temperature of the air; and
  an air exit connected with a conditioned air ductwork of the conditioned space;
the improvement comprising:

a rotary regenerative exchanger secured in front of a side opening made through the housing, the side opening communicating with the air circuit, the exchanger comprising:

an air outlet for partially evacuating the air outside the housing, the evacuated air being drawn from the air circuit by second blowing means;

an actuated balance damper secured in front of the air outlet for regulating the flow of the evacuated air;

actuating means for actuating the balance damper;

an air inlet for supplying fresh air inside the air circuit, the fresh air being drawn from outside the housing by third blowing means;

a rotary exchange wheel assembly for providing sensible and latent heat transfer between the evacuated air and the fresh air upon rotation of an exchange wheel by rotation means; and means for controlling the actuating means, the second blower means, the third blower means and the rotation means.

It is also an object of the present invention to provide a method for modifying an existing rooftop unit for conditioning air from a conditioned space, the unit comprising:

a housing;

an air circuit located in the housing, the air circuit comprising:

an air entry connected with an exhaust air ductwork of the conditioned space;

first blowing means for circulating the air in the air circuit;

air temperature conditioning means for varying the temperature of the air; and an air exit connected with a conditioned air ductwork of the conditioned space; the method comprising the steps of:

(a) making a side opening through the housing for communication with the air circuit;

(b) securing a rotary regenerative exchanger in front of the side opening, the exchanger comprising:

an air outlet for partially evacuating the air outside the housing, the evacuated air being drawn from the air circuit by second blowing means;

an actuated balance damper secured in front of the air outlet for regulating the flow of the evacuated air;

actuating means for actuating the balance damper;

an air inlet for supplying fresh air inside the air circuit, the fresh air being drawn from outside the housing by third blowing means;

a rotary exchange wheel assembly for providing sensible and latent heat transfer between the evacuated air and the fresh air upon rotation of an exchange wheel by rotation means; and means for controlling the actuating means, the second blower means, the third blower means and the rotation means.

The present invention is very suitable for providing air conditioning roof top units with a very compact design. It is also very suitable for modifying installed rooftop units as well as new or used units no yet installed.

A non restrictive description of a preferred embodiment will now be given with reference to the appended drawings.

DESCRIPTION OF A PREFERRED EMBODIMENT

Figure 1:
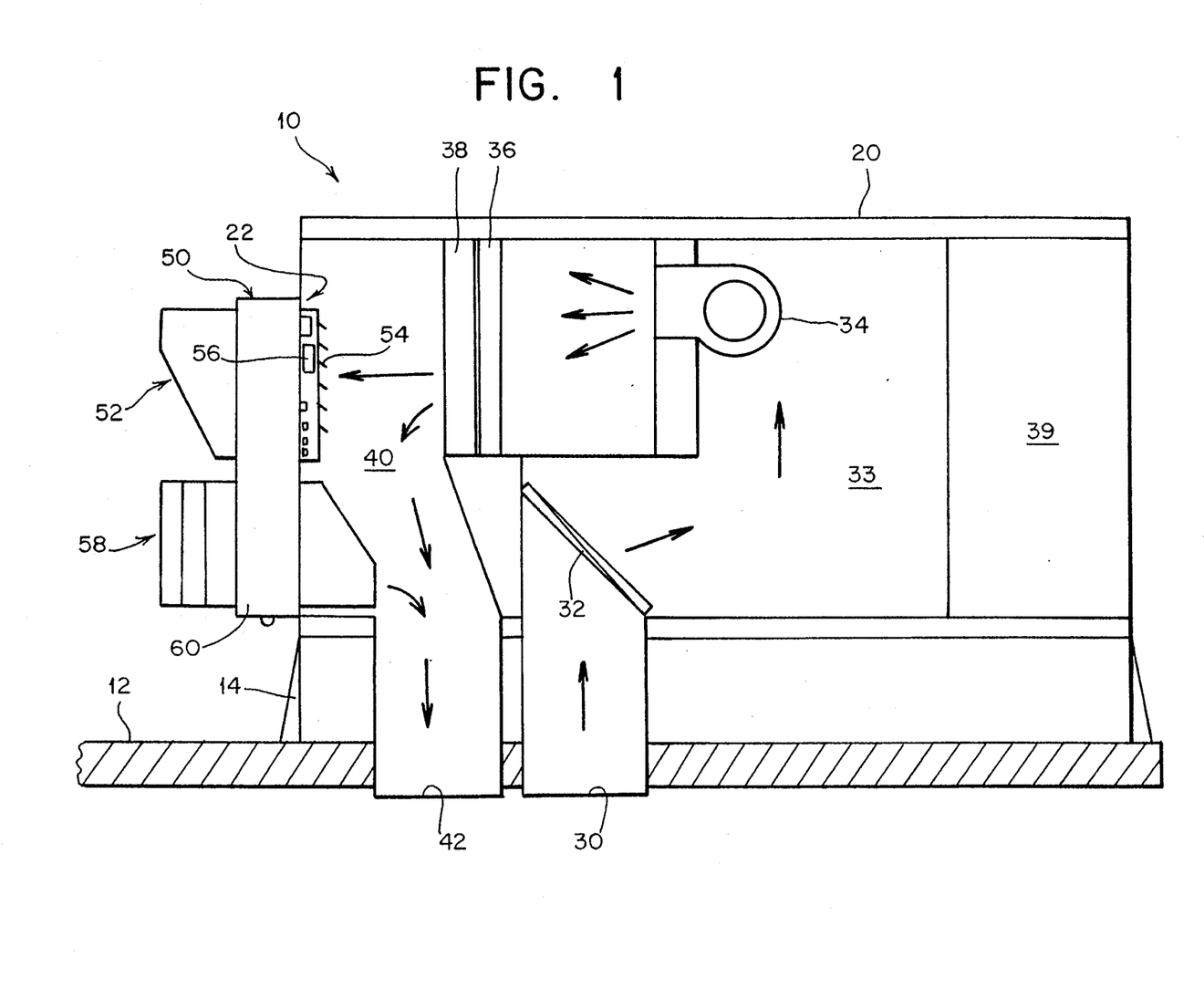
FIG. 1 is a cross-sectional view of a rooftop unit according to the present invention.

Referring to FIG. 1, there is shown a rooftop air-conditioning unit 10 installed on a roof 12. The roof 12 is usually the roof of a building, but may also be the roof of a room enclosed in a larger space. It should be noted that the term "roof" is a term in the industry and it is not mandatory that the unit 10 be installed on what is exactly a "roof" although it is usually the case since the roof is often the only available space for air conditioning units. The roof 12 is provided with one or several holes for connecting the unit 10 to the various air ducts. Since the unit 10 is generally very heavy, the portions of the roof 12 surrounding the unit 10 have to be reinforced. A curb 14 ensures proper sealing between the unit 10 and the roof 12.

The unit 10 comprises a housing 20 in which are located several air-conditioning components. The purpose of unit 10 is to heat or cool the air drawn from a conditioned space by an exhaust air ductwork (not shown). The conditioned space may be the interior of the building itself, a group of rooms or only one room. The size and capacity of the unit 10 is dependent on heating or cooling loads of the conditioned space. Although most air-conditioning units are designed for both heating and cooling the air to be conditioned, some units may only be designed for cooling while others may only be designed for heating.

Inside the housing 20 is an air circuit along which are located the air-conditioning components. The air circuit comprises an air entry 30 for connection with the return air ductwork of the conditioned space. Generally, air filters 32 are located after the air entry 30. A blower 34, such as a centrifugal blower, is located in the air circuit for circulating the air therein. The air is then urged through temperature conditioning means for varying the temperature thereof. As aforesaid, the air-conditioning units are generally designed for both cooling and heating the air depending on the needs. In the unit 10, the heating is preferably done by an electric heating element 36, although other suitable heating equipments may also be used. As for the cooling, it is preferably done by a cooling coil 38 in which is circulated water or a cooling refrigerant. A compressor 39 for the cooling refrigerant may be provided in the housing 20.

Once the air went through the temperature varying means, it enters a plenum chamber 40 having an air exit 42 for connection with a conditioned air ductwork (not shown) for providing the conditioned air to the conditioned space.

Because some undesirable gases, particles and odours cannot be filtered, and because restoring the suitable amount of oxygen in the air of a closed circuit cannot be done by the ordinary air conditioning equipments, it is essential to discard at least some of the air inside the air circuit and replace it with fresh air coming from the outside. However, this fresh air increases the operating costs of air conditioning systems because the fresh air has to be brought from the outside conditions to the desired air condition of the conditioned space. More particularly, the sensible and latent heat of the fresh air has to be modified so that the air returning to the conditioned space be at the suitable conditions.

The most effective way for reducing the operating costs is to transfer some of the sensible and latent heat from the exhaust air to the fresh air during cold periods, and to transfer some of the sensible and latent heat from the fresh air to the exhaust air during warm periods. Whenever possible, the fresh air should be used for cooling the conditioned air if the outside is cooler than the conditioned space in need to be cooled, and the fresh air should also be used for heating the conditioned air if the outside is hotter than the conditioned space in need to be heated. These later conditions are sometimes called "free cooling".

As aforesaid, rotary regenerative exchangers are very suitable devices for recovering sensible and latent heat. According to the present invention, it has been found that a rotary regenerative exchanger 50 may be secured on the unit 10 itself for reducing the installation costs and providing a very effective assembly.

As shown in FIG. 1, the rotary regenerative exchanger 50 is secured in front of a side opening 22 of the housing 20, for example on a side opening communicating with the plenum chamber 40. The term "side opening" refers to one of the usual six sides of the housing 20. While the side opening 22 is advantageously a lateral opening, it may also be a top opening or even a bottom opening, if the unit 10 is supported for example by legs (not shown). The side opening 22 may also be adjacent to the air entry 30 or the entry chamber 33.

Figure 3:
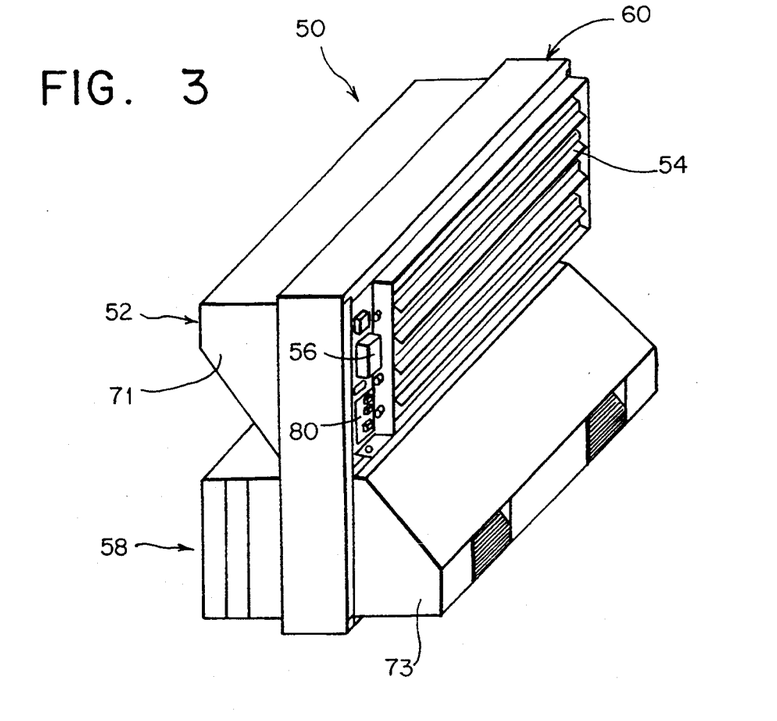
FIG. 3 is a perspective view of the rotary regenerative exchanger.

Referring to the example illustrated in FIGS. 1 and 3, the exchanger 50 comprises an air outlet 52 for partially evacuating the air outside the housing 20, more particularly directly to the outdoor or through an exhaust duct (not shown). The evacuated air is preferably drawn from the air circuit at the plenum chamber 40. An actuated balance damper 54 is secured in front of the air outlet 52 for regulating the flow of the evacuated air. The damper 54 is actuated by actuating means such as an endless screw motor 56.

The exchanger 50 also comprises an air inlet 58 for supplying the fresh air inside the plenum chamber 40. The fresh air may be directly drawn from to ambient air surrounding the housing 20 or drawn from another location with the use of an additional air duct (not shown).

Figure 2:
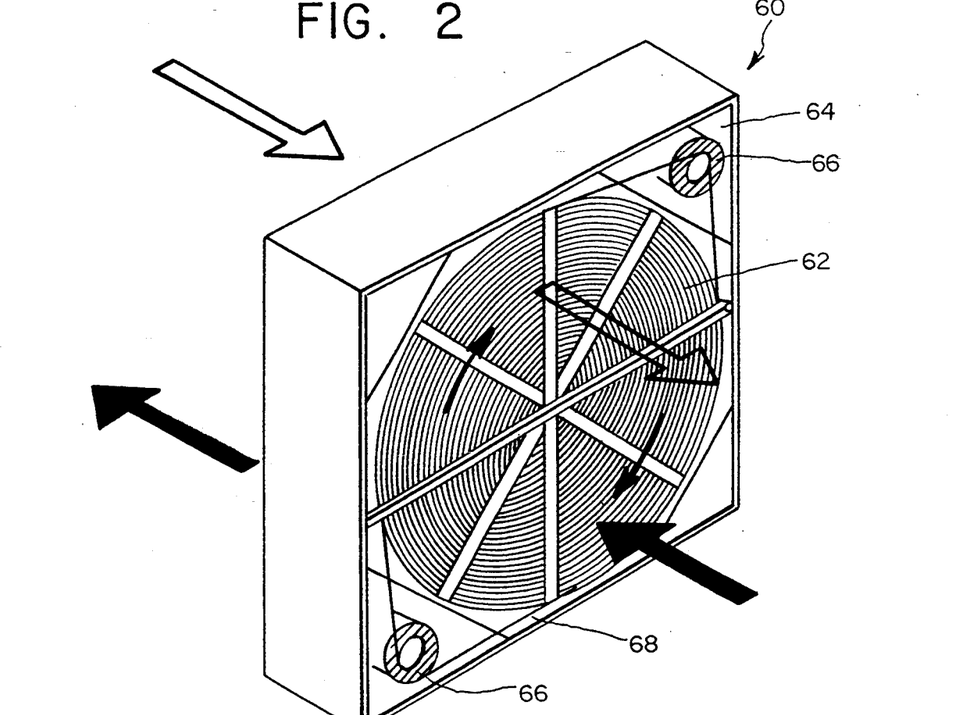
FIG. 2 is a schematic perspective view of the rotary exchange wheel assembly.

In the center of the exchanger 50 is located the rotary exchange wheel assembly 60 for providing sensible and latent heat transfer between the evacuated air and the fresh air. As shown in FIG. 2, the assembly 60 comprises an exchange wheel 62 surrounded by a housing 64 divided in two substantially air tight sections. The wheel 62 is rotatable by rotation means such as two electric motors 66 mechanically connected to the wheel 62 by means of a belt 68. In the preferred embodiment, the evacuated air goes through the upper section of the assembly 60 and the fresh air goes through the lower section of the assembly 60.

As known to those skilled in the art, sensible and latent heat are the two components of the total heat. Sensible heat is the energy contained within dry air and latent heat is the energy contained within moisture in the air.

The wheel 62 is made of a plurality of layers of a porous material through which air can flow and sensible and latent heat can be accumulated. When slowly rotating through counterflowing evacuated air and fresh air, the wheel 60 absorbs sensible and latent heat from the warmer air stream and transfers the absorbed total energy to the cooler air stream during the second half of its rotating cycle. Upon rotation at a typical 25 revolutions per minute, the wheel 60 provides a constant flow of energy from the warmer to the cooler air stream. Under optimum conditions, it has been calculated that the recovered energy may reach about 85% of the difference in total energy within the warmer and cooler air streams.

When the air streams go through the wheel 60, humidity in the vapor phase is absorbed in the 40–50% of the thickness of the wheel 60 on the corresponding side. Because the wheel 60 is rotating, the humidity of each side will be sent back to its original environment in the other half cycle. Since no surface is wet, dust retaining and fungal growth are substantially prevented.

Figure 4:
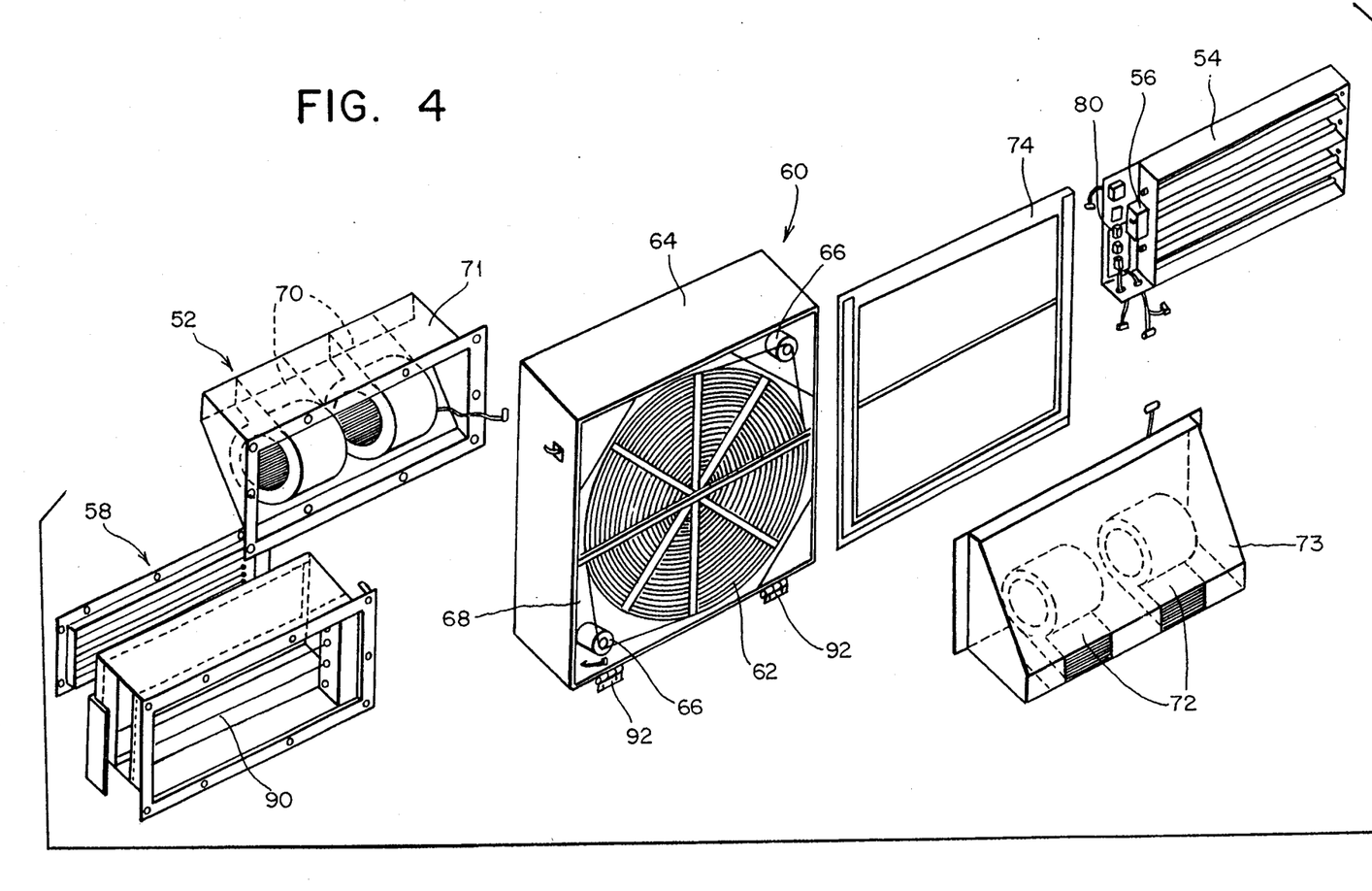
FIG. 4 is an exploded view of the rotary regenerative exchanger of FIG. 3.

Referring to FIG. 4, the air outlet 52 is provided with blowing means such as the two centrifugal blowers 70 for removing air from the air circuit. The air inlet 58 is also provided with blowing means such as the two centrifugal blowers 72 for pushing fresh air inside the air circuit. The blowers 70 and 72 are mounted respectively in casings 71 and 73 acting as funnels over their corresponding half of the assembly 60. The casing 73 is mounted on a frame 74, on which the damper 54 is also mounted. The frame 74 acts as the transition between the housing 20 and the exchanger 50.

In order to provide optimum operation, there are provided means for controlling the motor 56, the motor 66, and the blowers 70 and 72. These means may comprise indoor and outdoor probes (not shown) electrically connected to an electronic circuit 80 for calculating and controlling parameters such as the suitable amount of air to be exchanged, by changing the orientation of the damper 54, changing the speed of the blowers 70 and 72, and changing the suitable rotation speed of the wheel 62.

In cold regions, it may be very advantageous to install pre-heating means, such as the electrical element 90, for helping the operation of the wheel 62 since a very low fresh air temperature might lead to the formation of condensation on the wheel 62. This is typically required when the fresh air is at a temperature lower than −15° C.

In some conditions, it may be advantageous to install filters (not shown) at the air inlet 58 for keeping the wheel 62 very clean.

Figure 5:
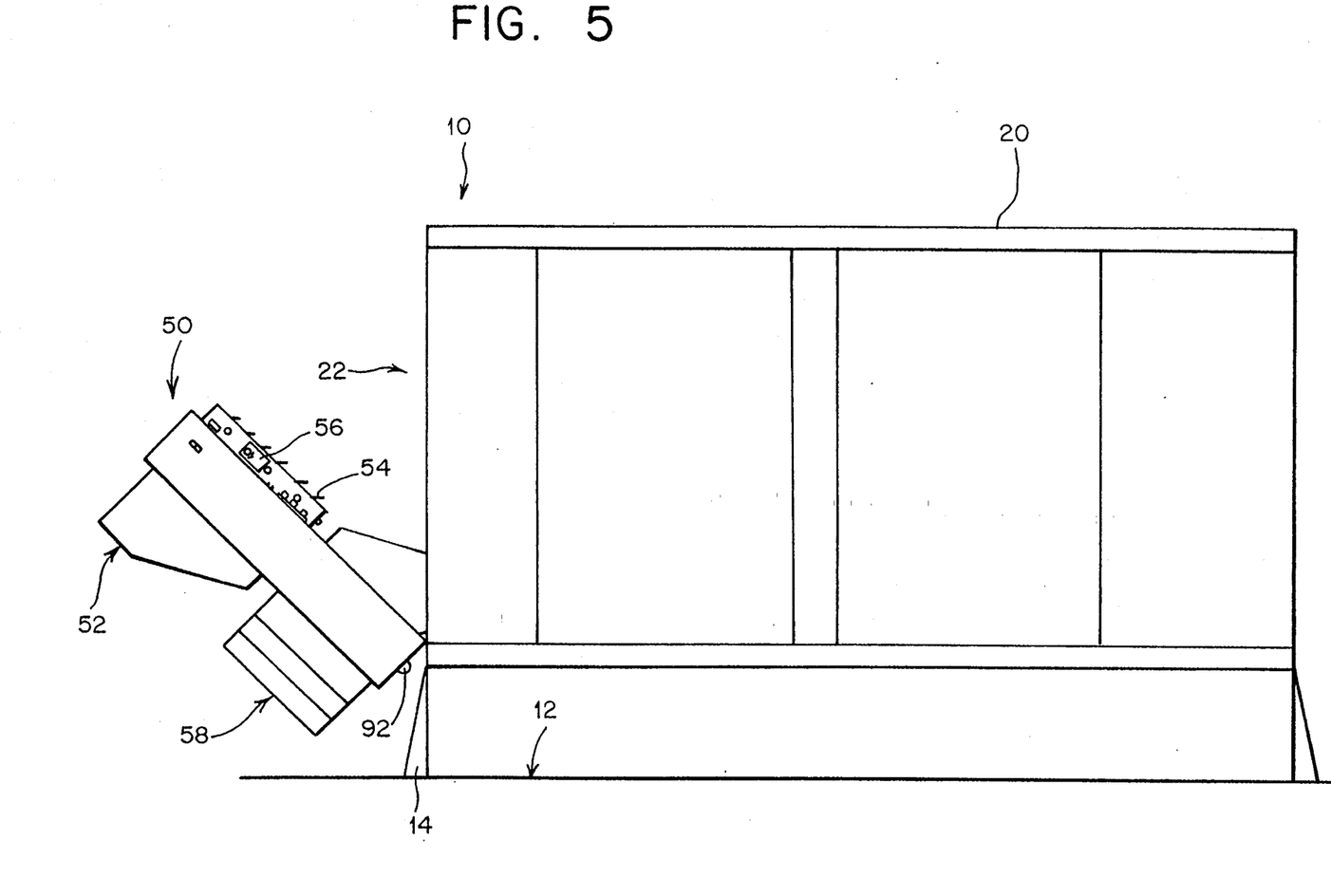
FIG. 5 is a side elevational view of a rooftop unit, showing the rotary regenerative exchanger being detached from the rooftop unit for maintenance.

Referring to FIGS. 4 and 5, the exchanger 50 may be provided with hinges 92 for allowing easy access for maintenance.

The use of an exchanger 50 on the unit 10 is very suitable when designing new air conditioning equipments as well as modifying installed equipments. When modifying already installed units, or new or used units in stock, the method is to find to most suitable location adjacent the plenum chamber 40 for the side opening 22 and then cut the side opening 22 through the housing 20. If the plenum chamber 40 is to be far from reach, ducts (not shown) may be added for linking the air outlet 52 and air inlet 58 with the plenum chamber 40.

Among the numerous advantages of the present invention, there is the fact that the weight of the exchanger 50 is supported by the existing or planned reinforcement structure on the roof 12 for supporting the original unit 10, thereby eliminating the need to modify the roof structure since the extra weight added by the exchanger 50 is usually small compared to the weight of ordinary unit 10.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

I claim:

1. A rooftop air-conditioning unit for conditioning air from a conditioned space, said unit comprising:
    a housing having side walls, a bottom wall and a top wall;
    an air circuit located in said housing, said air circuit comprising:
        an air entry comprising an aperture in said bottom wall for connection with an exhaust air ductwork of said conditioned space;
        first blowing means for circulating said air in said air circuit;
        air temperature conditioning means for varying the temperature of said air; and an air exit comprising an aperture in said bottom wall for connection with a conditioned air ductwork of said conditioned space;
    a rotary regenerative exchanger secured to one of said side walls outside said unit in front of a side opening of said housing, said side opening communicating with said air circuit, said exchanger comprising:
        an air outlet for partially evacuating said air outside said housing, said evacuated air being drawn from said air circuit by second blowing means;
        an actuated balance damper secured in front of said air outlet for regulating the flow of said evacuated air;
        actuating means for actuating said balance damper;
        an air inlet for supplying fresh air inside said air circuit, said fresh air being drawn from outside said housing by third blowing means;
        a rotary exchange wheel assembly for providing sensible and latent heat transfer between said evacuated air and said fresh air upon rotation of an exchange wheel by rotation means; and
        means for controlling said actuating means, said second blower means, said third blower means and said rotation means.

2. A unit according to claim 1, further comprising pre-heating means located in said air inlet for heating said fresh air.

3. A unit according to claim 2, wherein said fresh air is pre-heated when the temperature thereof is lower than $-15°$ C.

4. A unit according to claim 1, wherein said air outlet is connected to said plenum chamber for partially evacuating said air therefrom.

5. A unit according to claim 1, wherein said air temperature conditioning means comprise a cooling coil for cooling said air.

6. A unit according to claim 5, wherein said air temperature conditioning means comprise an electric heating element for heating said air.

7. In an installed rooftop air-conditioning unit for conditioning air from a conditioned space, said unit comprising:
    a housing having side walls, a bottom wall and a top wall;
    an air circuit located in said housing, said air circuit comprising:
        an air entry comprising an aperture in said bottom wall connected with an exhaust air ductwork of said conditioned space;
        first blowing means for circulating said air in said air circuit;
        air temperature conditioning means for varying the temperature of said air; and
        an air exit comprising an aperture in said bottom wall for connection with a conditioned air ductwork of said conditioned space;
    the improvement comprising:
    a rotary regenerative exchanger secured to one of said side walls outside said unit in front of a side opening of said housing, said side open communicating with said air circuit, said exchanger comprising:
        an air outlet for partially evacuating said air outside said housing, said evacuated air being drawn from said air circuit by second blowing means;
        an actuated balance damper secured in front of said air outlet for regulating the flow of said evacuated air;
        actuating means for actuating said balance damper;
        an air inlet for supplying fresh air inside said air circuit, said fresh air being drawn from outside said housing by third blowing means;
        a rotary exchange wheel assembly for providing sensible and latent heat transfer between said evacuated air and said fresh air upon rotation of an exchange wheel by rotation means;
        means for controlling said actuating means, said second blower means, said third blower means and said rotation means.

8. An improved unit according to claim 7, further comprising a pre-heating means located in said air inlet for heating said fresh air.

9. An improved unit according to claim 8, wherein said fresh air is pre-heated when the temperature thereof is lower than $-15°$ C.

10. An improved unit according to claim 7, wherein said air outlet is connected to said plenum chamber for partially evacuating said air therefrom.

11. A unit according to claim 7, wherein said air temperature conditioning means comprise a cooling coil for cooling said air.

12. A unit according to claim 11, wherein said air temperature conditioning means comprise an electric heating element for heating said air.

13. A method for modifying an existing rooftop air-conditioning unit for conditioning air from a conditioned space, said unit comprising:
    a housing having side walls, a bottom wall and a top wall;
    an air circuit located in said housing, said air circuit comprising:
        an air entry comprising an aperture in said bottom wall connected with an exhaust air ductwork of said conditioned space;

first blowing means for circulating said air in said air circuit;

air temperature conditioning means for varying the temperature of said air; and an air exit comprising an aperture in said bottom wall for connection with a conditioned air ductwork of said conditioned space;

ductwork of said conditioned space:

(a) making a slide opening through said housing for communication with said air circuit;

(b) securing a rotary regenerative exchanger in front of a said side opening outside the unit said exchanger comprising:

an air outlet for partially evacuating said air outside said housing, said evacuated air being drawn from said air circuit by second blowing means;

an actuated balance damper secured in front of said air outlet for regulating the flow of said evacuated air;

actuating means for actuating said balance damper;

an air inlet for supplying fresh air inside said air circuit, said fresh air being drawn from outside said housing by third blowing means;

a rotary exchange wheel assembly for providing sensible and latent heat transfer between said evacuated air and said fresh air upon rotation of an exchange wheel by rotation means; and means for controlling said actuating means, said second blower means, said third blower means and said rotation means.

* * * * *

UNITED STATES PATENT AND TRADEMARK OFFICE
CERTIFICATE OF CORRECTION

PATENT NO.   :   5,423,187
DATED        :   June 13, 1995
INVENTOR(S)  :   Bernard FOURNIER It is certified that error appears in the above-identified patent and that said Letters Patent is hereby corrected as shown below:

Column 9, line 12, delete "slide" and insert --side--.

Signed and Sealed this

Twelfth Day of December, 1995

Attest:

BRUCE LEHMAN

Attesting Officer

Commissioner of Patents and Trademarks